(12) United States Patent
He et al.

(10) Patent No.: US 10,680,486 B2
(45) Date of Patent: Jun. 9, 2020

(54) EXTERNAL ROTOR MOTOR

(71) Applicant: Zhongshan Broad-Ocean Motor Co., Ltd., Zhongshan (CN)

(72) Inventors: Jinhao He, Zhongshan (CN); Jincheng Zhu, Zhongshan (CN); Xiongcheng Wang, Zhongshan (CN)

(73) Assignee: ZHONGSHAN BROAD-OCEAN MOTOR CO. LTD., Zhongshan (CN)

( * ) Notice: Subject to any disclaimer, the term of this patent is extended or adjusted under 35 U.S.C. 154(b) by 193 days.

(21) Appl. No.: 15/838,300

(22) Filed: Dec. 11, 2017

(65) Prior Publication Data

US 2018/0102685 A1   Apr. 12, 2018

Related U.S. Application Data

(63) Continuation-in-part of application No. PCT/CN2016/075893, filed on Mar. 8, 2016, and a
(Continued)

(30) Foreign Application Priority Data

Jun. 23, 2015 (CN) .................... 2015 2 0435728 U
Jul. 4, 2015 (CN) .................... 2015 2 0485971 U

(51) Int. Cl.
  *H02K 1/04*   (2006.01)
  *H02K 5/16*   (2006.01)
  (Continued)

(52) U.S. Cl.
  CPC ............. *H02K 5/161* (2013.01); *H02K 1/187* (2013.01); *H02K 5/02* (2013.01); *H02K 5/22* (2013.01)

(58) Field of Classification Search
  CPC .......... H02K 1/187; H02K 5/02; H02K 5/161; H02K 5/22
  See application file for complete search history.

(56) References Cited

U.S. PATENT DOCUMENTS

| 4,682,065 A | * | 7/1987 | English | ................... | F16C 35/04 |
| | | | | | 310/156.26 |
| 7,994,663 B2 | * | 8/2011 | Harata | ................... | H02K 1/187 |
| | | | | | 310/43 |

(Continued)

FOREIGN PATENT DOCUMENTS

WO   WO2014/084553   *   6/2014

*Primary Examiner* — Yuriy Semenenko
(74) *Attorney, Agent, or Firm* — Matthias Scholl P.C.; Matthias Scholl

(57) ABSTRACT

An external rotor motor, including: a rotary shaft; a plastic-packaged stator including a sleeve base, a stator core, a terminal insulator, coil windings, and a plastic-packaged body; and an external rotor sleeving on the plastic-packaged stator. The terminal insulator is disposed on the end face of the stator core. The coil windings are coiled on the terminal insulator. The sleeve base is disposed in an axle hole in the center of the stator core. The rotary shaft is disposed in the sleeve base. Two ends of the rotary shaft are supported by the bearing. One end of the rotary shaft protrudes out from the sleeve base and is connected to the external rotor. The top of the sleeve base extends outwards to form a plurality of arms, and the plurality of arms each includes an outer end which is provided with a bolt.

12 Claims, 8 Drawing Sheets

Related U.S. Application Data continuation-in-part of application No. PCT/CN2015/090117, filed on Sep. 21, 2015.

(51) Int. Cl.
*H02K 1/18* (2006.01)
*H02K 5/22* (2006.01)
*H02K 5/02* (2006.01)

(56) References Cited

U.S. PATENT DOCUMENTS

| | | | |
|---|---|---|---|
| 2006/0238045 A1* | 10/2006 | Hatano | F16K 31/04 310/71 |
| 2014/0184034 A1* | 7/2014 | Wang | H02K 11/33 310/68 R |
| 2015/0318762 A1* | 11/2015 | O | H02K 7/14 310/43 |
| 2017/0085147 A1* | 3/2017 | Tang | H02K 29/00 |
| 2017/0222503 A1* | 8/2017 | Wang | F24F 1/22 |

* cited by examiner

EXTERNAL ROTOR MOTOR

CROSS-REFERENCE TO RELATED APPLICATIONS

This application is a continuation-in-part of International Patent Application No. PCT/CN2015/090117 with an international filing date of Sep. 21, 2015, and of International Patent Application No. PCT/CN2016/075893 with an international filing date of Mar. 8, 2016, designating the United States, now pending, and further claims foreign priority benefits to Chinese Patent Application No. 201520435728.7 filed Jun. 23, 2015, and to Chinese Patent Application No. 201520485971.X filed Jul. 4, 2015. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The invention relates to an external rotor motor.

Description of the Related Art

Conventional external rotor motors include a plastic-packaged stator. The plastic-packaged stator is difficult to produce, has relatively low structural integrity, and is prone to failure during long-term use.

SUMMARY OF THE INVENTION

In view of the above-described problems, it is one objective of the invention to provide an external rotor motor that has improved structure, relatively high structural strength, and is reliable during long term use.

To achieve the above objective, in accordance with one embodiment of the invention, there is provided an external rotor motor, comprising: a rotary shaft; a plastic-packaged stator comprising a sleeve base, a stator core, a terminal insulator, coil windings, and a plastic-packaged body; and an external rotor, the external rotor sleeving on the plastic-packaged stator. The terminal insulator is disposed on an end face of the stator core; the coil windings are coiled on the terminal insulator; the sleeve base is disposed in an axle hole in a center of the stator core; the sleeve base, stator core, terminal insulator, and coil windings are integrated with the plastic-packaged body; bearing housings are disposed on two ends of the sleeve base; each bearing housing comprises a bearing; the rotary shaft is disposed in the sleeve base, and two ends of the rotary shaft are supported by the bearing; one end of the rotary shaft protrudes out from the sleeve base and is connected to the external rotor; a top of the sleeve base extends outwards to form a plurality of arms, and the plurality of arms each comprises an outer end which is provided with a bolt; the plastic-packaged body covers the plurality of arms, and a screw pole of the bolt is exposed out from a top surface of the plastic-packaged body.

In a class of this embodiment, the outer end of each arm comprises a locating hole, the bolt is disposed on the locating hole, a head of the bolt is fixed in the locating hole by the plastic-packaged body, and the screw pole of the bolt is exposed out from the top surface of the plastic-packaged body.

In a class of this embodiment, arc flanges are disposed on an outer wall of the sleeve base between two adjacent arms, and every two adjacent arms are connected via the arc flanges.

In a class of this embodiment, the plurality of arms each comprise a top surface comprising a reinforcing rib.

In a class of this embodiment, the plurality of arms each comprise a bottom surface comprising the reinforcing rib.

In a class of this embodiment, four arms which are uniformly distributed circumferentially are provided.

In a class of this embodiment, one end of the rotary shaft extends out of the sleeve base and is connected to the external rotor, and then extends out from a center of the external rotor to form a drive end adapted to connect to a load.

In a class of this embodiment, the sleeve base comprises a base and a sleeve part protruding from a center of one end of the base, the plurality of arms protrudes radially from an outer wall of the base, the plurality of arms each comprise a bottom surface and a top surface, the top surface and/or bottom surface comprises reinforcing ribs, and the reinforcing ribs are slantways disposed between the outer wall of the base and an outer edge of the arms.

In a class of this embodiment, the top surface is parallel to the bottom surface, the top surface and the bottom surface each comprise two reinforcing ribs, the two reinforcing ribs on the top surface of the arms are located on two side edges of the top surface, and the two reinforcing ribs on the bottom surface of the arms are located on two side edges of the bottom surface.

In a class of this embodiment, the reinforcing ribs on the top surface and the reinforcing ribs on the bottom surface are slanting in opposite directions.

In a class of this embodiment, arc flanges are disposed on an outer wall of the sleeve base between two adjacent arms, every two adjacent arms are connected via the arc flanges, and the arc flanges and the arms comprise through holes.

In a class of this embodiment, an outer edge of the top surface of the arms is provided with a lug boss, and a mounting hole is disposed in a center of the lug boss.

In a class of this embodiment, the two reinforcing ribs on the top surface are slantways disposed between the outer wall of the base and the lug boss, and the outer wall of the base, the two reinforcing ribs and the lug boss form an upper groove.

In a class of this embodiment, an outer edge of the bottom surface of the arms is provided with a stopper, the two reinforcing ribs on the bottom surface are slantways disposed between the outer wall of the base and the stopper, and the outer wall of the base, the two reinforcing ribs and the stopper form a lower groove.

In a class of this embodiment, four arms which are uniformly distributed circumferentially are provided.

Advantages of the external rotor motor according to embodiments of the invention are summarized as follows:

1. The top of the sleeve base extends outwards to form a plurality of arms, and the plurality of arms each comprises an outer end which is provided with a bolt; the plastic-packaged body covers the plurality of arms, and a screw pole of the bolt is exposed out from a top surface of the plastic-packaged body. The design is practical, increases the binding force of the plastic-packaged body and the sleeve base, and improves the structural strength. The external rotor motor can be fastened by the bolt, which is convenient to operate and improves the reliability of the motor.

2. The outer end of each arm comprises a locating hole, the bolt is disposed on the locating hole, a head of the bolt is fixed in the locating hole by the plastic-packaged body, and the screw pole of the bolt is exposed out from the top surface of the plastic-packaged body. The structure is stable, and easy to assemble.

3. The arc flanges are disposed on an outer wall of the sleeve base between two adjacent arms, and every two adjacent arms are connected via the arc flanges. The arrangement of the arc flanges increases the structural strength and the reliability of the motor.

4. The top/bottom surface of the arms comprises reinforcing ribs, which increases the structural strength and the reliability of the motor.

5. The top surface and/or bottom surface comprises reinforcing ribs, and the reinforcing ribs are slantways disposed between the outer wall of the base and the outer edge of the arms, preferably, the top surface is parallel to the bottom surface, the top surface and the bottom surface each comprise two reinforcing ribs, the two reinforcing ribs on the top surface of the arms are located on two side edges of the top surface, and the two reinforcing ribs on the bottom surface of the arms are located on two side edges of the bottom surface. The design increases the structural strength and the reliability of the motor.

6. The arc flanges and the arms comprise through holes. The upper groove and the lower groove can effectively increase the binding force of the plastic-packaged body and the sleeve base, thus improving the structural strength of the motor, and preventing the detachment of the plastic-packaged body.

7. The outer edge of the top surface of the arms is provided with a lug boss, and a mounting hole is disposed in the center of the lug boss. The structure is stable, and easy to assemble.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing an external rotor motor are described below. It should be noted that the following examples are intended to describe and not to limit the invention.

Example 1

Figure 1:
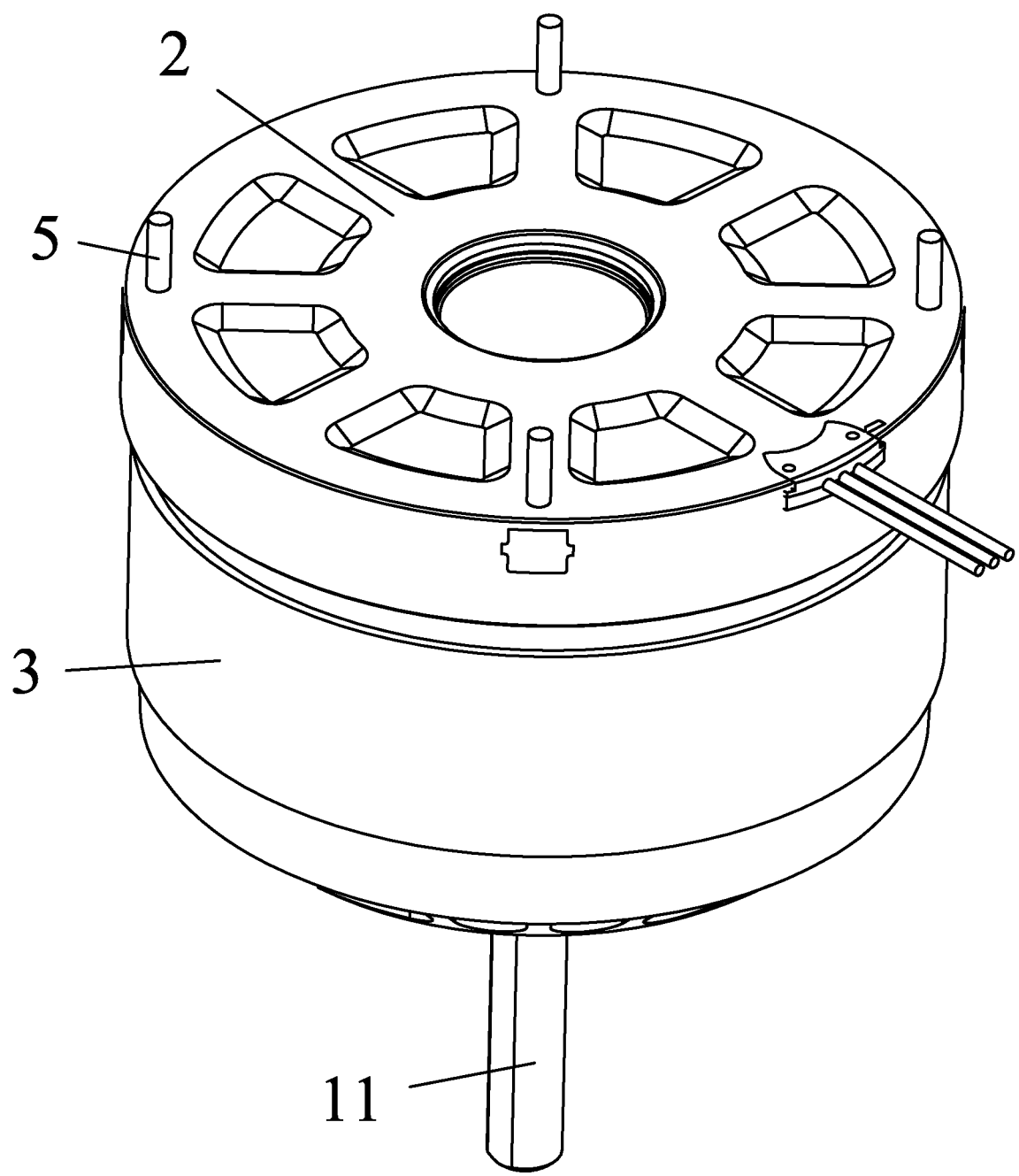
FIG. 1 is a stereogram of an external rotor motor in accordance with one embodiment of the invention.
Figure 2:
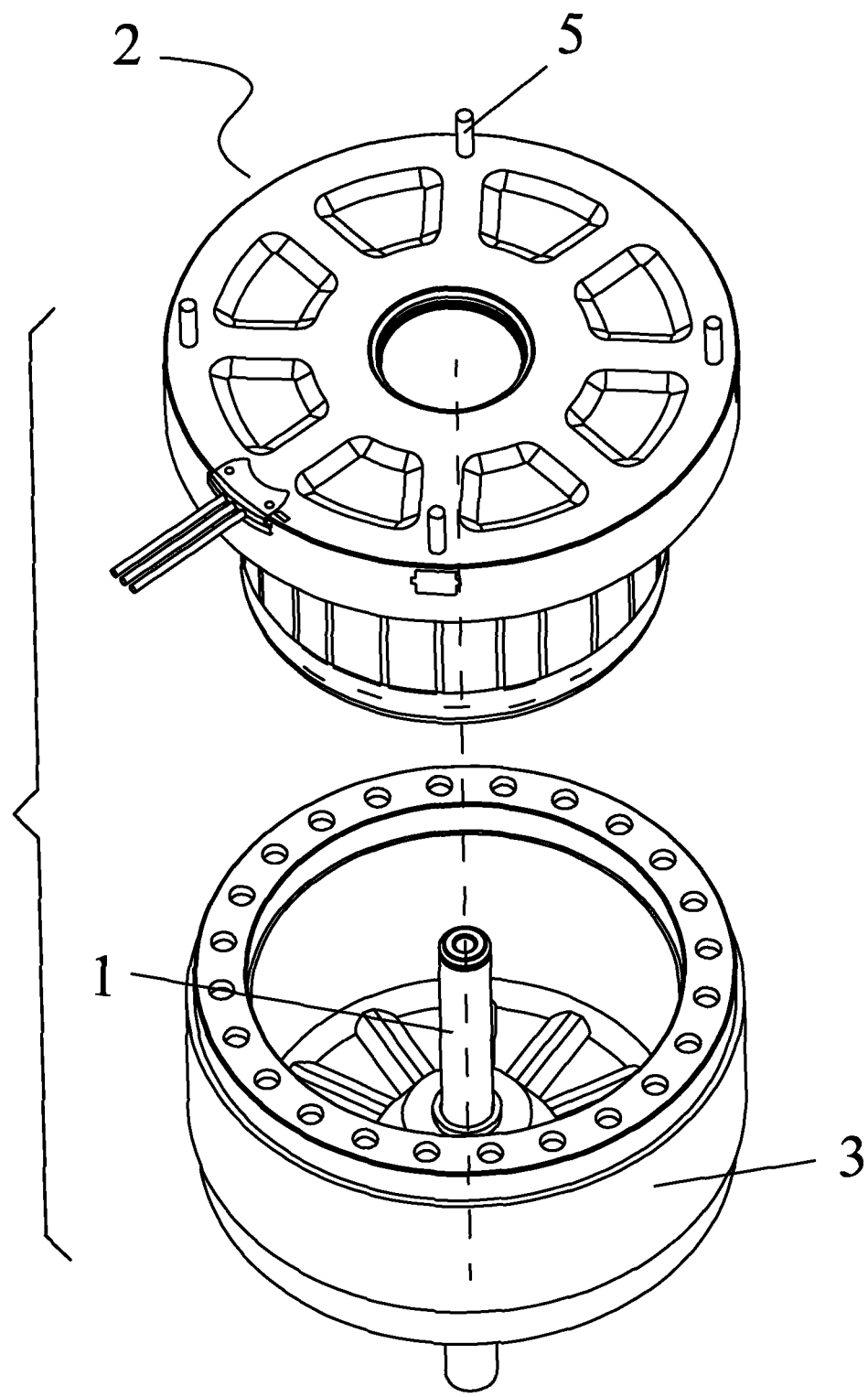
FIG. 2 is an exploded view of an external rotor motor in accordance with one embodiment of the invention.
Figure 3:
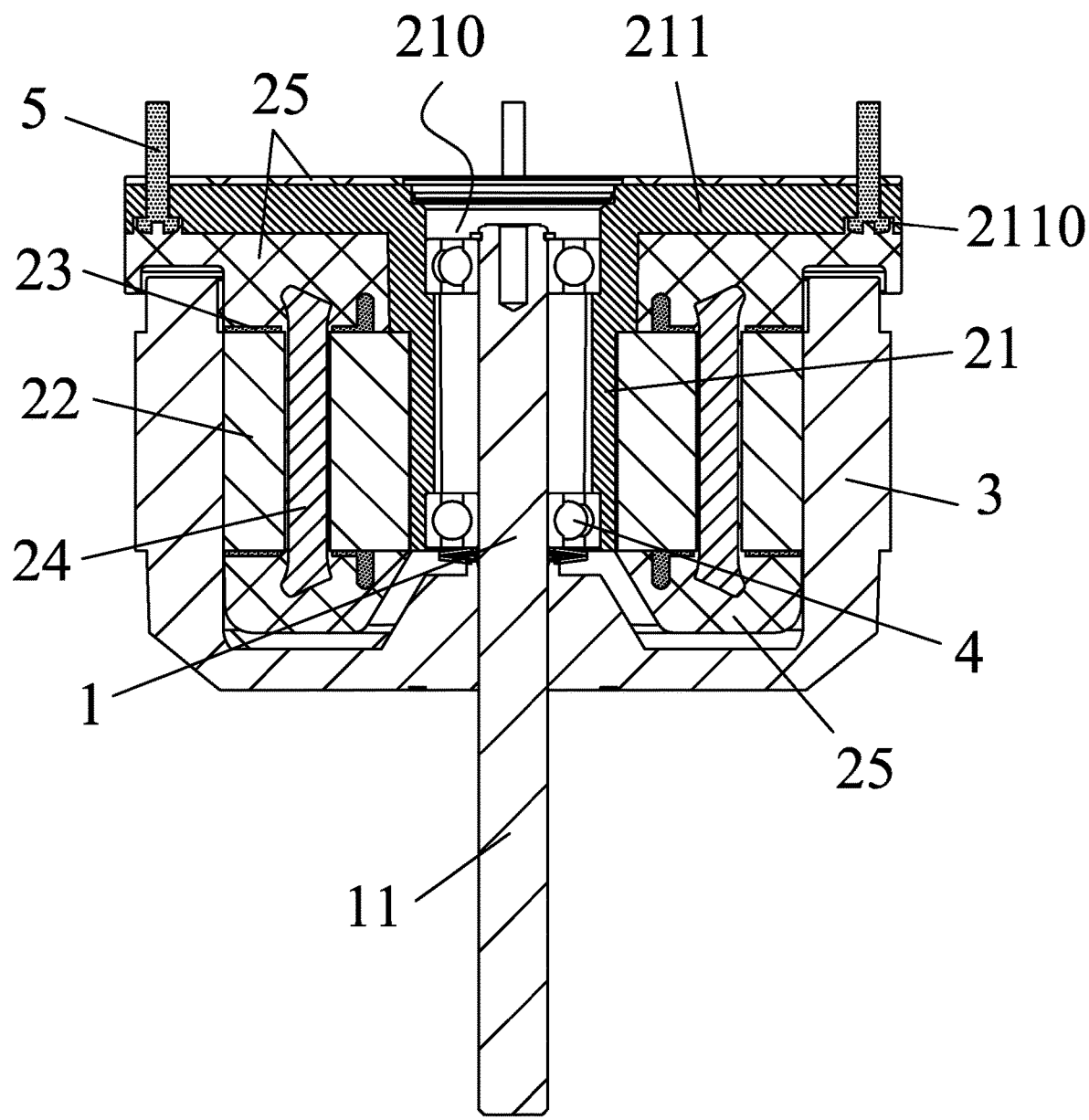
FIG. 3 is a schematic diagram of an external rotor motor in accordance with one embodiment of the invention.
Figure 4:
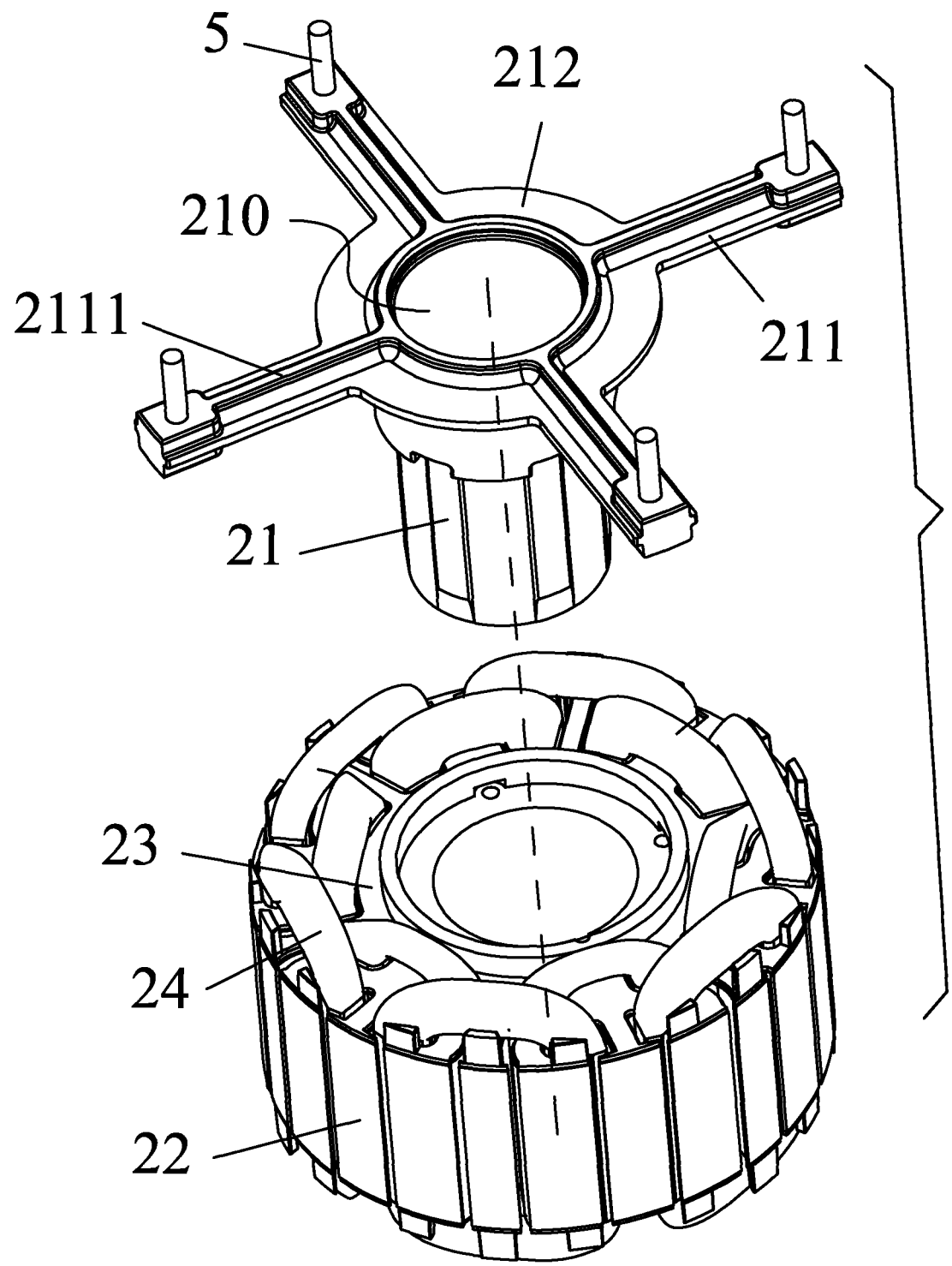
FIG. 4 is a stereogram of a plastic-packaged stator without a plastic-packaged body in accordance with one embodiment of the invention.

As shown in FIGS. 1-4, an external rotor motor comprises a rotary shaft 1, a plastic-packaged stator 2, and an external rotor 3. The external rotor 3 sleeves on the plastic-packaged stator 2. The plastic-packaged stator 2 comprising a sleeve base 21, a stator core 22, a terminal insulator 23, coil windings 24, and a plastic-packaged body 25. The terminal insulator 23 is disposed on an end face of the stator core 22. The coil windings 24 are coiled on the terminal insulator 23; the sleeve base 21 is disposed in an axle hole in the center of the stator core 22; the sleeve base 21, stator core 22, terminal insulator 23, and coil windings 24 are integrated with the plastic-packaged body 25; bearing housings 210 are disposed on two ends of the sleeve base 21; each bearing housing 210 comprises a bearing 4; the rotary shaft 11 is disposed in the sleeve base 21, and two ends of the rotary shaft 1 are supported by the bearing 4; one end of the rotary shaft 1 protrudes out from the sleeve base 21 and is connected to the external rotor 3, and then extends out from the center of the external rotor 3 to form a drive end 11 adapted to connect to a load; the top of the sleeve base 21 extends outwards to form a plurality of arms 211, and the plurality of arms each comprises an outer end comprising a locating hole 2110, a bolt 5 is disposed on the locating hole 2110, the plastic-packaged body 25 covers the plurality of arms 211, and the screw pole of the bolt 5 is exposed out from the top surface of the plastic-packaged body 25. Arc flanges 212 are disposed on the outer wall of the sleeve base 21 between two adjacent arms 211, and every two adjacent arms 211 are connected via the arc flanges 212. The top surface of the plurality of arms 211 comprise a reinforcing rib 2111. The bottom surface of the plurality of arms 211 comprise the reinforcing rib 2111. In this example, four arms are uniformly distributed circumferentially on the sleeve base.

Example 2

This example is an improvement of Example 1, and the improvement lies in that: the structure of the sleeve base 21 is improved, so as to increase the binding force of the plastic-packaged body 25 and the sleeve base 21, thus improving the structural strength.

Figure 5:
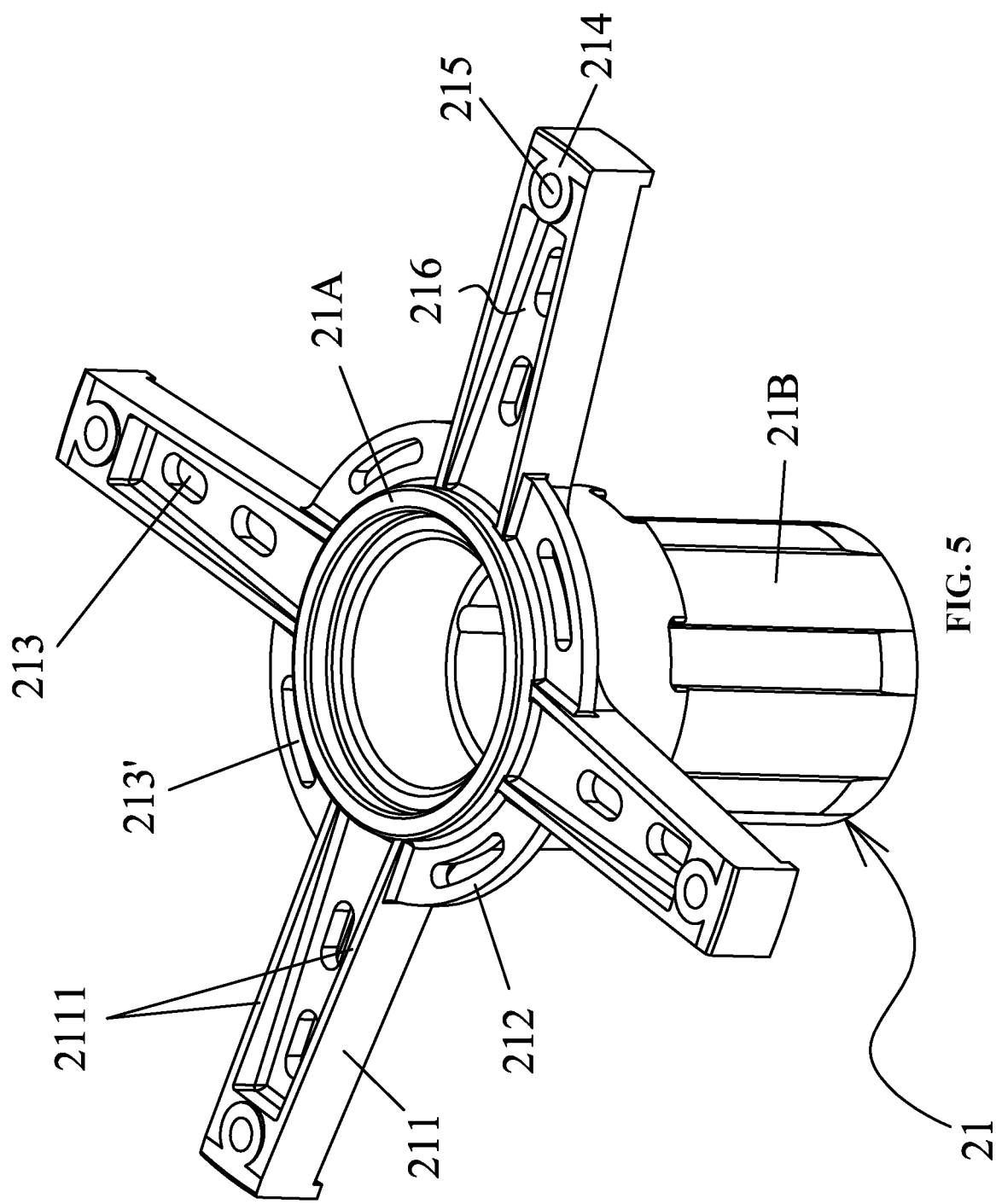
FIG. 5 is a stereogram of a sleeve base in accordance with one embodiment of the invention.
Figure 6:
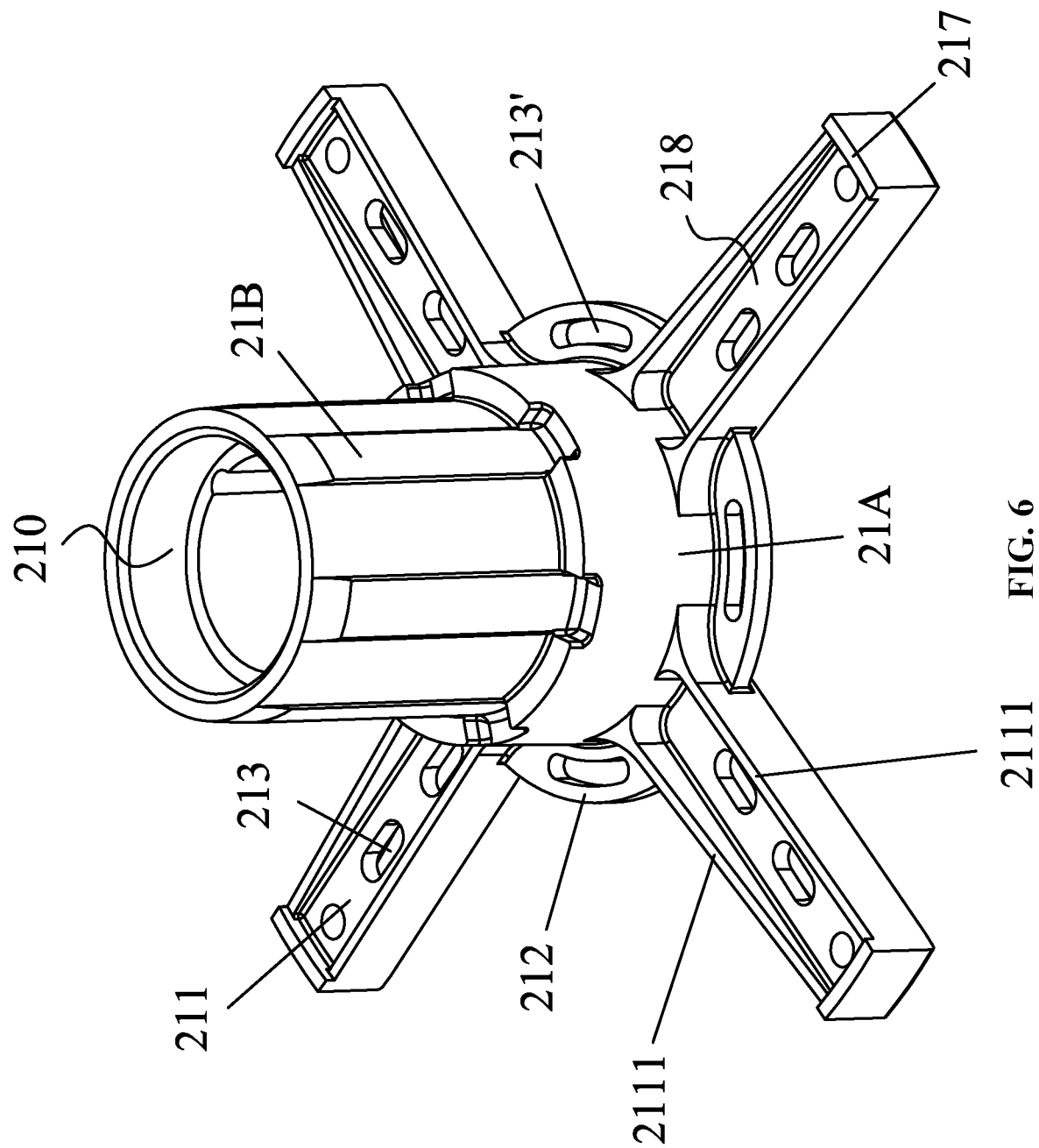
FIG. 6 is another stereogram of a sleeve base in accordance with one embodiment of the invention.
Figure 7:
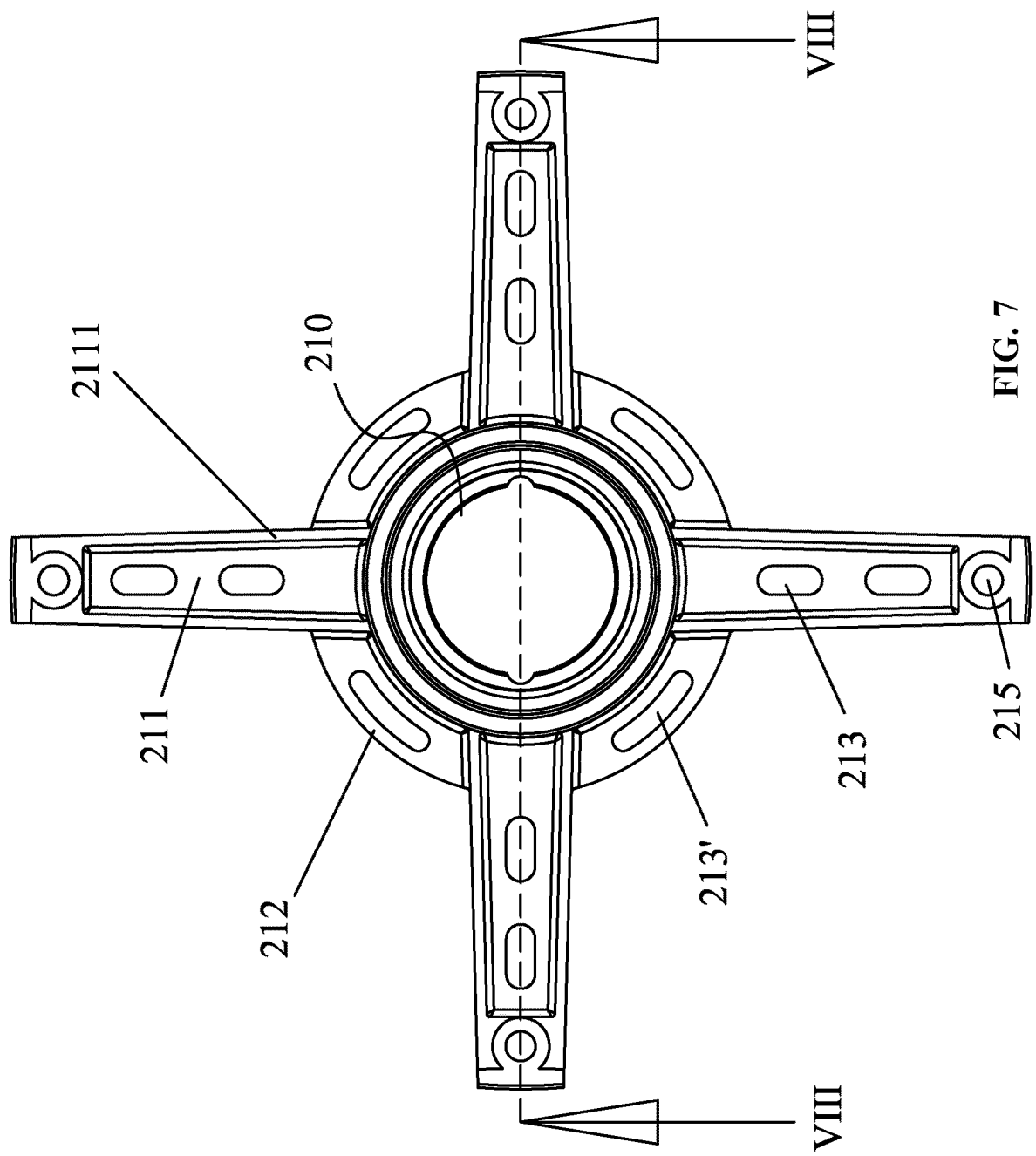
FIG. 7 is a bottom view of a sleeve base in accordance with one embodiment of the invention.
Figure 8:
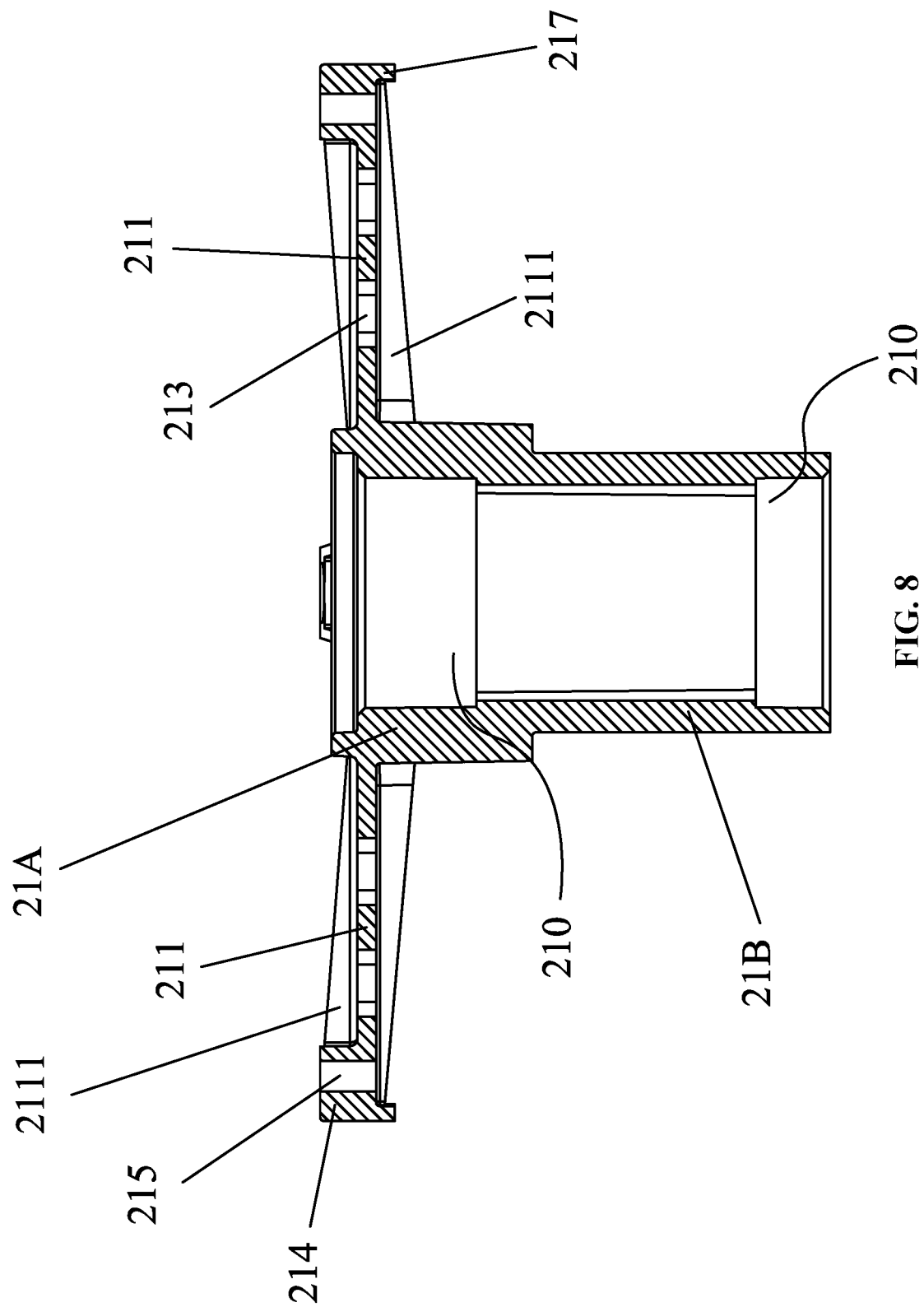
FIG. 8 is a sectional view taken from line VIII-VIII in FIG. 7.

As shown in FIGS. 5-8, the sleeve base 21 comprises a base 21A and a sleeve part 21B protruding from a center of one end of the base 21A, the plurality of arms 211 protrudes radially from the outer wall of the base 21A, the plurality of arms 211 each comprise a bottom surface and a top surface, the top surface and/or bottom surface comprises reinforcing ribs 2111, and the reinforcing ribs 2111 are slantways disposed between the outer wall of the base 21A and an outer edge of the arms 211. The top surface is parallel to the bottom surface, the top surface and the bottom surface each comprise two reinforcing ribs 2111, the two reinforcing ribs 2111 on the top surface of the arms 211 are located on two side edges of the top surface, and the two reinforcing ribs 2111 on the bottom surface of the arms 211 are located on two side edges of the bottom surface. The reinforcing ribs 2111 on the top surface and the reinforcing ribs 2111 on the bottom surface are slanting in opposite directions.

Arc flanges 212 are disposed on the outer wall of the sleeve base 21 between two adjacent arms 211, every two adjacent arms 211 are connected via the arc flanges 212, and the arc flanges and the arms comprise through holes 213, 213' which allow the plastic-packaged body 25 to pass through, thus increasing the binding force of the plastic-packaged body 25 and the sleeve base 21, and improving the structural strength. The outer edge of the top surface of the arms 211 is provided with a lug boss 214, and a mounting hole 215 is disposed in the center of the lug boss 214. The two reinforcing ribs 2111 on the top surface are slantways disposed between the outer wall of the base 21A and the lug boss 214, and the outer wall of the base 21A, the two reinforcing ribs 2111 and the lug boss 214 form an upper groove 216. The outer edge of the bottom surface of the arms 211 is provided with a stopper 217, the two reinforcing ribs 2111 on the bottom surface are slantways disposed between the outer wall of the base 21A and the stopper 217, and the outer wall of the base 21A, the two reinforcing ribs 2111 and the stopper 217 form a lower groove 218. In this example, four arms 211 are uniformly distributed circumferentially on the sleeve base.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An external rotor motor, comprising:
   a rotary shaft;
   a plastic-packaged stator, the plastic-packaged stator comprising a sleeve base, a stator core, a terminal insulator, coil windings, and a plastic-packaged body; and
   an external rotor, the external rotor sleeving on the plastic-packaged stator; wherein:
   the terminal insulator is disposed on an end face of the stator core;
   the coil windings are coiled on the terminal insulator;
   the sleeve base is disposed in an axle hole in a center of the stator core;
   the plastic-packaged body fills space between the sleeve base, the stator core, the terminal insulator, and the coil windings and covers surfaces of the sleeve base, the stator core, the terminal insulator, and the coil windings such that the sleeve base, the stator core, the terminal insulator, and the coil windings are integrated with the plastic-packaged body;
   bearing housings are disposed on two ends of the sleeve base; each bearing housing comprises a bearing; the rotary shaft is disposed in the sleeve base, and two ends of the rotary shaft are supported by the bearing;
   one end of the rotary shaft protrudes out from the sleeve base and is connected to the external rotor;
   a top of the sleeve base extends outwards to form a plurality of arms, and the plurality of arms each comprises an outer end which is provided with a bolt;
   the plastic-packaged body covers the plurality of arms, and a screw pole of the bolt is exposed out from a top surface of the plastic-packaged body;
   the outer end of each arm comprises a locating hole, the bolt is disposed on the locating hole, a head of the bolt is fixed in the locating hole by the plastic-packaged body, and the screw pole of the bolt is exposed out from the top surface of the plastic-packaged body; and
   arc flanges are disposed on an outer wall of the sleeve base between two adjacent arms, and every two adjacent arms are connected via the arc flanges.

2. The motor of claim 1, wherein the plurality of arms each comprise a top surface comprising a reinforcing rib.

3. The motor of claim 2, wherein the plurality of arms each comprise a bottom surface comprising the reinforcing rib.

4. The motor of claim 1, comprising four arms which are uniformly distributed circumferentially.

5. The motor of claim 1, wherein one end of the rotary shaft extends out of the sleeve base and is connected to the external rotor, and then extends out from a center of the external rotor to form a drive end adapted to connect to a load.

6. An external rotor motor, comprising:
   a rotary shaft;
   a plastic-packaged stator, the plastic-packaged stator comprising a sleeve base, a stator core, a terminal insulator, coil windings, and a plastic-packaged body; and
   an external rotor, the external rotor sleeving on the plastic-packaged stator; wherein:
   the terminal insulator is disposed on an end face of the stator core;
   the coil windings are coiled on the terminal insulator;
   the sleeve base is disposed in an axle hole in a center of the stator core;
   the plastic-packaged body fills space between the sleeve base, the stator core, the terminal insulator, and the coil windings and covers surfaces of the sleeve base, the stator core, the terminal insulator, and the coil windings such that the sleeve base, the stator core, the terminal insulator, and the coil windings are integrated with the plastic-packaged body;
   bearing housings are disposed on two ends of the sleeve base; each bearing housing comprises a bearing; the rotary shaft is disposed in the sleeve base, and two ends of the rotary shaft are supported by the bearing;
   one end of the rotary shaft protrudes out from the sleeve base and is connected to the external rotor;
   the sleeve base comprises a base and a sleeve part protruding from a center of one end of the base, a plurality of arms protrudes radially from an outer wall of the base, the plurality of arms each comprise a bottom surface and a top surface, the top surface and/or bottom surface comprises reinforcing ribs, and the reinforcing ribs are slantways disposed between the outer wall of the base and an outer edge of the arms; and
   the top surface is parallel to the bottom surface, the top surface and the bottom surface each comprise two reinforcing ribs, the two reinforcing ribs on the top surface of the arms are located on two side edges of the top surface, and the two reinforcing ribs on the bottom surface of the arms are located on two side edges of the bottom surface.

7. The motor of claim 6, wherein the reinforcing ribs on the top surface and the reinforcing ribs on the bottom surface are slanting in opposite directions.

8. The motor of claim 6, wherein arc flanges are disposed on an outer wall of the sleeve base between two adjacent arms, every two adjacent arms are connected via the arc flanges, and the arc flanges and the arms comprise through holes.

9. The motor of claim 8, wherein an outer edge of the top surface of the arms is provided with a lug boss, and a mounting hole is disposed in a center of the lug boss.

10. The motor of claim 9, wherein the two reinforcing ribs on the top surface are slantways disposed between the outer wall of the base and the lug boss, and the outer wall of the base, the two reinforcing ribs and the lug boss form an upper groove.

11. The motor of claim 10, wherein an outer edge of the bottom surface of the arms is provided with a stopper, the two reinforcing ribs on the bottom surface are slantways disposed between the outer wall of the base and the stopper, and the outer wall of the base, the two reinforcing ribs and the stopper form a lower groove.

12. The motor of claim 11, comprising four arms which are uniformly distributed circumferentially.

* * * * *